United States Patent [19]
Stickney et al.

[11] Patent Number: 6,043,813
[45] Date of Patent: Mar. 28, 2000

[54] INTERACTIVE COMPUTERIZED WITNESS INTERROGATION RECORDING TOOL

[75] Inventors: Michael E. Stickney, El Toro, Calif.; William J. Kemp, Jr., Rochester Hills, Mich.

[73] Assignee: Raytheon Company, Lexington, Mass.

[21] Appl. No.: 08/422,689

[22] Filed: Apr. 14, 1995

Related U.S. Application Data

[63] Continuation of application No. 07/926,014, Aug. 6, 1992, abandoned.

[51] Int. Cl.[7] ........................................... G06F 3/14
[52] U.S. Cl. ............................................ 345/326; 345/473
[58] Field of Search ..................... 364/419.08, 419.01, 364/419.04; 395/155, 119, 127, 135, 152, 159, 161; 345/326, 333, 334, 339, 340, 348, 302, 419, 427, 435, 473

[56] References Cited

U.S. PATENT DOCUMENTS

| | | | |
|---|---|---|---|
| 4,884,972 | 12/1989 | Gasper | 434/185 |
| 4,953,107 | 8/1990 | Hedley et al. | 345/422 |
| 4,970,666 | 11/1990 | Welsh et al. | 345/423 |
| 5,057,019 | 10/1991 | Harvey | 434/155 |
| 5,214,758 | 5/1993 | Ohba et al. | 345/473 |
| 5,239,623 | 8/1993 | Sato et al. | 345/419 |
| 5,247,610 | 9/1993 | Oshima et al. | 345/435 |
| 5,276,785 | 1/1994 | Mackinlay et al. | 345/427 |
| 5,315,692 | 5/1994 | Hansen et al. | 345/419 |
| 5,325,472 | 6/1994 | Horiuchi et al. | 345/427 |
| 5,338,206 | 8/1994 | Hupfer | 434/305 |

FOREIGN PATENT DOCUMENTS

| | | |
|---|---|---|
| 0284764 | 10/1988 | European Pat. Off. . |
| 2221128 | 1/1990 | United Kingdom . |
| 2247597 | 3/1992 | United Kingdom . |
| 2260240 | 4/1993 | United Kingdom . |
| 2269729 | 2/1994 | United Kingdom . |

OTHER PUBLICATIONS

Kantor, "Computing in the Courtroom. (Application of High Technology to Criminal Law) (Trends)", *PC Magazine*, v 12, n 4, Feb. 23, 1993, p. 32.
Clark, "Litigation Corner: Using Computer Graphics at Trial", *Legal Assistant Today*, v 9, n 6, Jul./Aug. 1992, pp. 143–145, Abstract Only.
Siether, "Expert Witness. (Computer Simulation in Courtroom)", *Forbes*, v 134, Sep. 24, 1984, p. 202(2).
Simone, "Autodesk Inc.: Autodesk Animator Pro and Autodesk Multimedia Explorer," *PC Magazine*, v 11, n 14, Aug. 1992, p. 452(3).

*Primary Examiner*—Matthew M. Kim
*Assistant Examiner*—Crescelle N. dela Torre
*Attorney, Agent, or Firm*—William C. Schubert; Glenn H. Lenzen, Jr.

[57] ABSTRACT

An interactive computerized witness interrogation recording tool (10) which provides a way to rapidly convert verbal descriptions of objects and events into graphical displays. The verbal descriptions are entered into the interrogation recording tool (10) by an operator utilizing a keyboard (16), graphical input device (18) and an icon based control panel (32) in a display device (30). Commands utilized by the operator are stored in a command library (44) or originate from a textual algorithm (54) which can generate a time sequence of objects and events based on the statements. The representation of the object and events are stored in a 3D geometry database (46) which is displayed by using a geometry display generator (52) under control of a command interpreter (42) and on the display device (30). Because the display is created in real time, the individual providing the statements is able to immediately confirm or deny the accuracy of the representation as it is being constructed in its various stages. Further, the textual algorithm (54) can be configured to confirm or deny the plausibility of the statements made.

21 Claims, 4 Drawing Sheets

INTERACTIVE COMPUTERIZED WITNESS INTERROGATION RECORDING TOOL

This is a continuation application Ser. No. 07/926.014 filed Aug. 6, 1992, now abandoned.

BACKGROUND OF THE INVENTION

1. Technical Field

This invention relates to graphical display systems and in particular to a system for generating a display of graphical objects in response to statements describing the objects.

2. Discussion

The translation of verbal descriptions of objects and events into graphical form is useful in many situations. There may include, for example, the graphical depiction witness statements in a variety of legal proceedings including legal depositions, police interrogations, testimony in court, etc. Other situations in which visual representations of statements are useful include various kinds of lecturing and teaching situations.

Conventional techniques for translating verbal descriptions into graphical displays have a number of drawbacks. The common technique of having the speaker make a sketch of what he is describing is unreliable due to the frequent lack of drawing skills on the part of the speaker, as well as length of time it may take for the speaker to prepare such sketches. Having an artist prepare sketches by hand or by means a computer graphics system is often not practical. For example, during the course of a deposition or trial testimony there is simply not time for an artist to prepare accurate drawings to reflect the descriptions. Drawings prepared after an interrogation would require a second interrogation to allow the witness to view the drawings and verify their accuracy. Further, if the drawings were not correct, an additional period of time would be needed to correct them requiring scheduling additional time for the speaker to verify their accuracy. In many kinds of proceedings, available time and money simply does not permit these additional sessions.

Moreover, static drawings often do not adequately portray the objects and events as described by a witness. Thus it would be desirable to create animations which depict dynamic events described by the speaker. But, the above considerations of time and cost are magnified significantly if one were to attempt to create such animations.

Accordingly it would be desirable to provide a system for quickly and accurately generating graphical representations of a person's statements regarding objects and events. It would also be desirable to provide such a system that does not rely on the drawing skills of the speaker. It would be desirable to provide such a system which can be quickly altered if needed; for example, where the graphical representation requires correction upon review by the speaker. Further, in the case of legal proceedings it would be desirable to have such a system which can create graphics quickly enough to be verified immediately by the speaker so that the speaker can testify as to the accuracy of the graphical representation created. Additionally, it would be desirable to provide a system with the above features which can create a dynamic portrayal of events as described by a person.

SUMMARY OF THE INVENTION

Pursuant to the present invention, a system and method is provided for creating visual displays in response to verbal statements. The system permits the rapid creation of static and dynamic graphical displays representing descriptions of a scene and/or event.

In accordance with one aspect of the invention a system is provided for creating a visual display in response to statements that includes a unit for generating a set of graphical objects described in the statements. Also, the system includes an operator controlled input device which is adapted to process inputs representative of said statements, wherein the inputs describe the location, orientation and form of said objects over a period of time. In addition, there is a textural algorithm processor for creating new responses to inputs and for converting these inputs into a plurality of representations of the temporal displacement of the objects. The system then manipulates and displays the graphical objects in accordance with the representations.

In accordance with a second aspect of the present invention a method is provided for creating a visual display of a set of objects. The method includes the steps of receiving a series of verbal statements containing descriptions of the objects, converting them into an algorithm and then generating a plurality of representations of the objects at locations, orientations and forms based on the algorithm. The locations, orientations, and forms of the objects in a temporal sequence corresponding to the representations are then determined and displayed.

As a result, the present invention provides a way to rapidly convert verbal descriptions of objects and events into graphical displays. Because this display is created in real time, the individual providing the description is able to immediately confirm or deny the accuracy of the representation as it is being constructed in it's various stages.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

The present invention is a computer-based tool for recording, and arranging and reforming graphical objects stored in a three dimensional geometric database in response to statements. In the preferred embodiment, the invention is adapted to respond to statements made by a witness during a legal proceeding, such as testimony taken by a witness in court or in a deposition. That is, the present invention is a tool which permits rapid recording and visualization of witness testimony describing the state of affairs and behavior of object and events. It should be noted that this is but one application of the teachings of the present invention, and that many other uses may be put to the basic techniques of this invention in such diverse settings as education and training, police interrogation, or as a general purpose communication tool.

Another important aspect of the present invention is that it provides for the automated analysis of statements as an immediate confirmation of their veracity. For example, the preferred embodiment employs algorithms to determine the static and dynamic disposition of objects as described by the witness, which are then displayed. These algorithms show whether the description is self-consistent because they represent physical laws. Rapid feedback of a representation of a witness' statements then allows immediate corroboration of the representation. On the other hand, when the algorithm's presentation of the statements indicates the implausibility of the witness' statement, this result may be used to challenge or discredit the testimony of the witness.

In more detail, the present invention is a computer-based tool used for recording and arranging and reforming graphical objects stored in a three dimensional geometric database to represent statements. The invention permits an operator to record statements as they are made by the witness via entry and manipulation of graphical objects. These graphical objects may include three dimensional solid objects such as model automobiles, buildings, people, other cultural features; as well as planar objects such as lines, text, arrows, regular polygons, and splines. The three dimensional solid objects and the planar objects will coexist in the same three dimensional geometrical space. Both the planar and solid objects can be changed in shape, location, and orientation via algorithms or manual control. The invention has the ability to record witness' statements as text (via the operator) for inclusion in the geometric database as planar objects, or as algorithms that serve to simulate object motion or shape changes. In this way, the system of the present invention can produce charts, pictures, and animations that represent the static state of the geometric database or alternatively, represent sequences of states or new forms that result from executing these algorithms.

The state, in particular, the position, velocity, accelerations and form of objects and individuals which are the subject of interrogation can be recorded as a state of a three dimensional geometric space and as dynamic algorithms rather then as text alone. The scene and events which are the subject of the witness statements can also be viewed from various positions by employing conventional computer graphic software techniques.

The present invention is related to 3D layout computer based tools such as CAD/CAM systems. However, it possesses the additional versatility of providing both static, dynamic and form representations in a highly interactive and natural manner. It is designed to geometrically record information in real time. In contrast, conventional graphical design tools are not adapted to respond to statements and to generate representations of those statements rapidly. Moreover, conventional CAD/CAM systems are not designed to record both static geometry, form and dynamics as algorithms.

Figure 1:
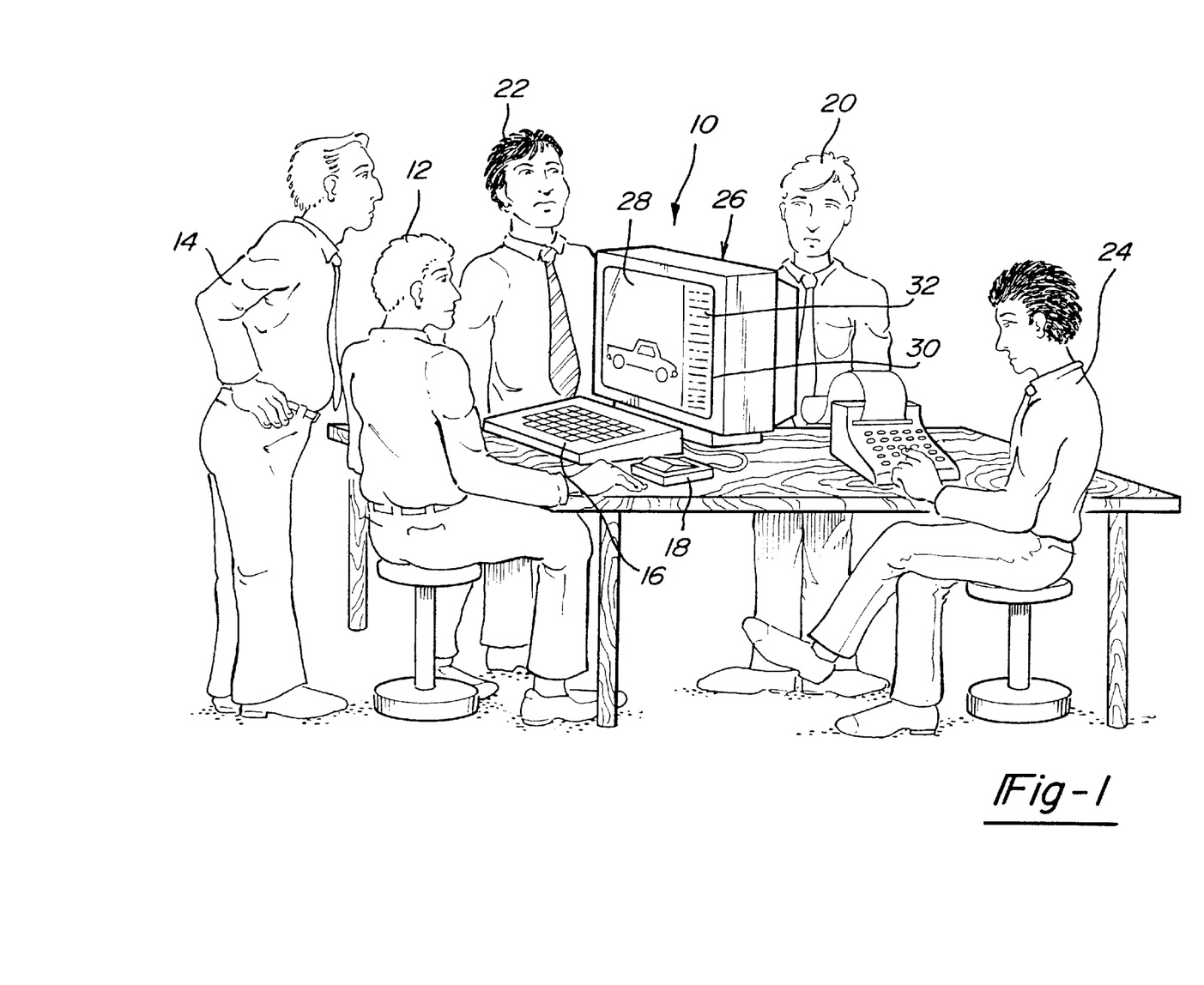
FIG. 1 is an drawing of the interrogation recording tool in accordance with a preferred embodiment of the present invention in use at a legal deposition.

Referring now to FIG. 1 an interrogation recording tool 10 in accordance to the preferred embodiment of the present invention is shown as it would appear in use at a legal deposition. Seated in front of the interrogation recording tool 10 is an operator 12 who is entering information from statements by a witness 14 into the interrogation recording tool 10 by means of a keyboard 16 and a mouse 18. The plaintiff's lawyer 20 and defendant's lawyer 22 are shown, as well as a court reporter 24. The interrogation recording tool 10 also includes a video display unit 26 which includes a screen containing a geometry display window 28 and a control panel window panel 30 containing a series of graphical control icons 32.

As the witness 14 gives testimony, the operator 12 encodes objects and their geometric relationships as they are being described. This is done by entering and moving geometric objects within a 3D database; entering planar objects into 3D database and moving them about; changing shapes of objects via parametrized algorithms or manually; and by changing the viewing position of the 3D database. The dynamics of object interrelationships and object shape changes are encoded as textual algorithms. These algorithms are sequences of statements entered at the keyboard 16 by the operator that are understood by the interrogation recording tool 10 and which represent the testimony of the witness. The witness can view the graphical display to confirm its accuracy, for example, by viewing animations produced by the algorithms.

Figure 2:
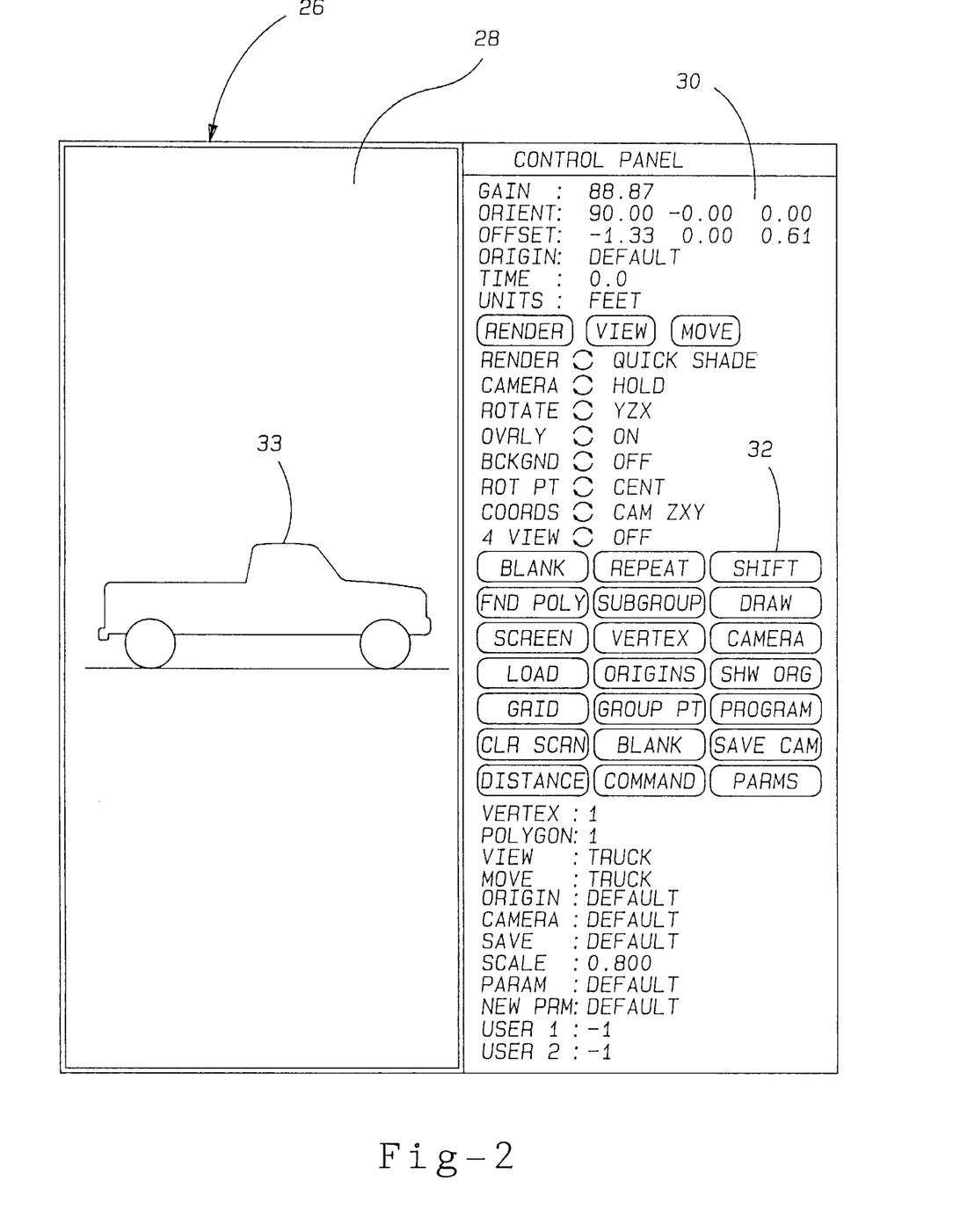
FIG. 2 is an example of a window layout for a display screen in accordance with the present invention including both a geometry display window and a control window.
Figure 3:
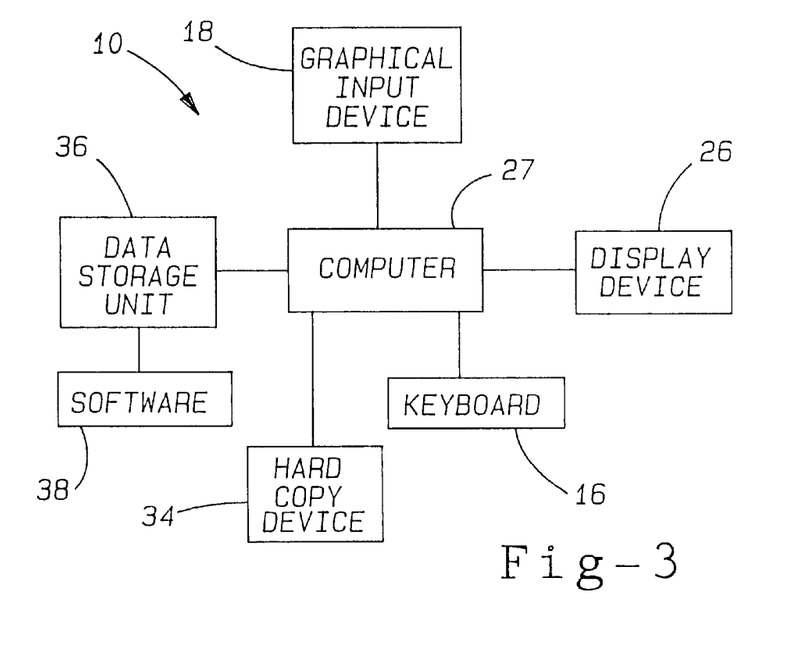
FIG. 3 is a hardware block diagram of the present invention.

To record witness information the interrogation recording tool 10 creates an image on the display device which consists of a series of windows. Referring now to FIG. 2, there are shown an example of a window layout for the display unit 26 in accordance with the present invention. Two basic windows are resident on the display: the geometry display window 28, and the control window 30 through which commands are entered by means of a graphical input device 18 and a set of icons 32. The geometry display window 28 graphically shows the current state of the 3D geometry database portion which will include one or more two or three-dimensional graphical objects 33. A block diagram of the hardware of the interrogation recording tool 10 is shown in FIG. 3. A computer CPU 27 is connected to a number of peripherals. These include a graphical input device 18 which may comprise a mouse, track ball or other device, and a display device 26, which may consist of a conventional video display terminal. Also the computer 27 is connected to a keyboard 16 which the operator will use to input some of the witness' statements. A hard copy producing device such as a printer 34 is used to produce hard copy records of the graphical displays. A data storage unit 36 may comprise a conventional hard drive which stores the operating system and other software 38, which is described in more detail below.

If it is desired to enter an image from the geometry display window 24 into the interrogation record, the operator 12 will select a command which will cause the interrogation recording tool 10 to record the image on the hard copy device 34. When the hard copy is completed it may be removed and entered into the legal record. The state of the geometric database, images, viewing position, dynamical algorithms and any other data entered into the invention may be recorded on a data storage unit 36 for use at a later time.

Figure 4:
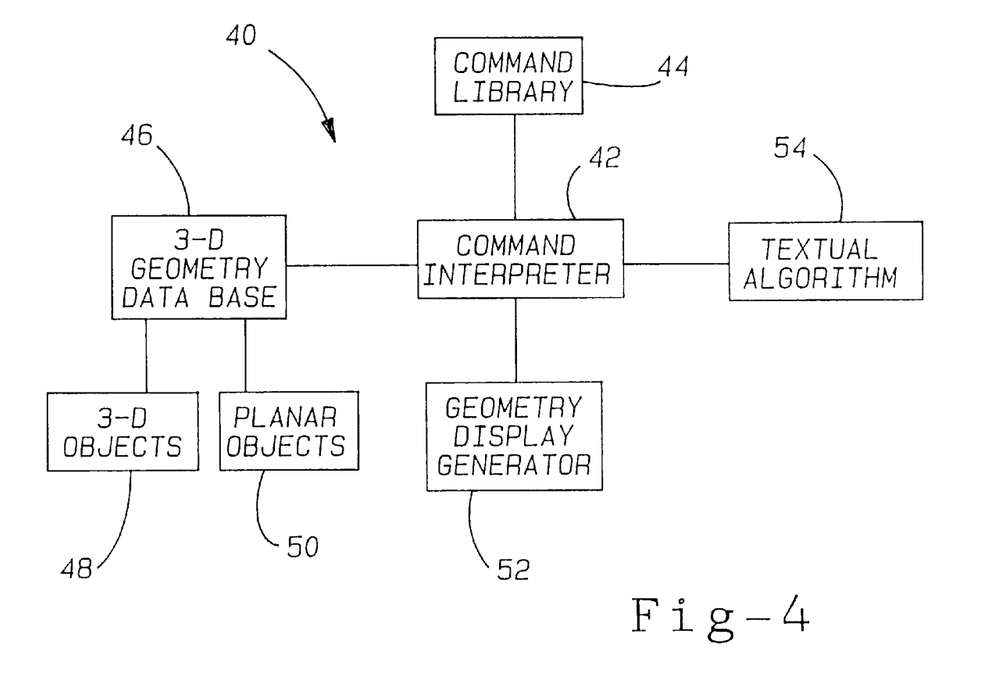
FIG. 4 is a software block diagram of the present invention.

Referring now to FIG. 4 a high level software block diagram 40 of the present invention is shown. At the center of the diagram is a command interpreter 42 which acts as a dispatcher by receiving commands, instructing the computer 27 to carryout the commands, and then waiting for a subsequent command. The command interpreter 42, for example, may receive a command to store the current configuration of a 3D geometry database 46. The operation of the command interpreter 42 is described in more detail below in connection with FIG. 5. Valid commands received by the command interpreter 42 must be found in a command library 44 which is a library of all of the functions that can be performed. These would include the commands which can be activated by the control window 30. In addition, commands can also be input by means of the keyboard 16 or from dynamical or shaping algorithms. The 3D geometry database 46 contains the current representation of the witness statements as exemplified by geometric objects. The 3D geometry database includes representations of both 3D objects 48 and planar objects 50. The 3D objects may include, for example, three dimensional sold objects such as automobiles, buildings, people, etc. The planar objects may include the two dimensional objects such as lines, text, arrows, and regular polygons which coexist in the same three dimensional geometrical space. A geometry display generator 52 takes the configuration of the geometry database 46 and turns it into a image which is displayed on the display window 28. The two-dimensional geometry display is overlayed on top of the 3D geometry display.

In more detail, the geometry display generator 52 utilizes conventional computer graphics techniques to convert the geometry database into a display. For example, it employs a renderer to accomplish the display of two-dimensional and three-dimensional information. It establishes a three-dimensional affine transformation and projects both three-dimensional and two-dimensional information in accordance with the transformation onto two display planes respectively. The geometry display generator 52 differs from the conventional tools in that the affine transformation is created on the basis of the camera position specified for the renderer. Then, the software can do a projection of the 3D geometry onto the 2D display plane. That is, the 2D and 3D information are on two different actual planes and the planes are then combined. To create an animated display of time sequences of geometric representations, the geometry display generator 52 periodically invokes an algorithmically manipulated database. At each time step the algorithm, via recursion or other appropriate technique produces a database configuration, i.e. positions objects and deforms objects. The geometry display generator then projects the configuration database onto the three-dimensional and two-dimensional display planes.

A textual algorithm software module 54 interprets dynamical algorithms which describe a simulation of the witness statements that can be used to produce movements of objects within the database, as described in more detail below. In brief, the textual algorithm 54 moves objects within the database in a manner specified by the input parameters. In more detail, the textual algorithm 54 has a parser and compiler that produces code for a recursive finite state machine that executes the code in compiled form. It will be appreciated that the finite state machine executes the algorithm. It decides which instruction to execute next by the transversal of a tree structure. The textual algorithm 54 contains commands that appear in the command library 44 along with the parameters to submit with those commands. In this way, the interrogation recording tool 10 can be run by the algorithm rather then just by the operator. For example, the textual algorithm 54 generates the configuration of an object in motion at various time intervals automatically. Further, the textual algorithm 54 will indicate if it does not have all of the information necessary or is incorrectly stated before it runs.

In operation, a sentence spoken by a witness 14 is translated into a set of commands by the operator 12. These commands are communicated to the interrogation recording tool 10 via the control window 30 using the graphical input device 18, the keyboard 16, or via a textual algorithm 54 that can be encoded as the witness speaks and entered into the interrogation recording tool 10. Alternatively, some voice input from the witness may be interpreted directly by the system utilizing voice recognition technology.

As an example of the process of translating witness descriptions into a set of commands to the invention, suppose a witness makes the following statement: "At the point of impact the truck left front tire was located 30 feet south of the street light and was 6 inches from the center line". One translation of this sentence into a set of commands and actions by the operator 12 is as follows.

Select overhead camera position, if necessary.

Select distance command.

Use graphical input device to locate distance icon to correct position in database.

Select truck action if necessary.

Drag truck so that truck left front tire is centered on icon.

Clear distance icon if desired.

Recall previous camera position if desired.

There usually will be several ways to translate a sentence into a series of commands and actions. For example in the case of the above witness sentence, each object maintains a center of action for which there is a default. The center of action refers to the particular portion of an object which is directed to a location by a curser. Also, it is the point about which the object will rotate in response to a rotation command. The default may be the geometric center of the object. The object center of action can be arbitrary selected as illustrated in the following alternative set of commands in response to the above witness statement:

Select overhead camera position if necessary.

Select distance command.

Use graphical input device to locate icon to correct position in database.

Select center of action for truck as point where left front tire touches road.

Select truck action if necessary.

Cause truck center of action to be collocated with distance icon.

Clear distance icon if desired.

Recall previous camera position if desired. Using this second approach, the truck is now ready to be easily rotated into the correct orientation which does not move the center of action so the truck left tire stays positioned correctly.

The process of recording dynamical information as algorithms that simulate witness statement and that can be used to produce movements of objects immediately within the database will be illustrated with the following example. Suppose the witness observed the rear end collision of two vehicles at an intersection. Five seconds prior to the collision the witness claims to have been at a specified position and attitude. Further, suppose that the geometric information has been previously recorded by the interrogation recording tool 10. The witness claims to have been traveling at 25 MPH with the steering wheel turned 90 degrees to the right. The dynamical information consists of the speed and the fact that the steering wheel was turned 90 degrees to the right. An algorithm that determines witness vehicle position as a function of time will be constructed. This algorithm can be entered into the interrogation recording tool 10 and used to produce a simulation of the vehicle kinematics over a time interval. The first step is to define the following data items:

t=time interval in seconds*.

r=vehicle speed in MPH*.

y=change in yaw angle about witness vehicle center of action per time interval.

w=wheel base of witness vehicle in feet*.

s=steering ratio*.

a=steering wheel angle*.

d=perpendicular distance from vehicle right front wheel to center of action.

The data items identified by the * (asterisk) are items for which data must be entered. The pertinent equations are as follows:

d=wcos(90−sa)

y=rt/d

The algorithm will compute y & d from input data and then use y and d to establish the location of the vehicle center of action and yaw the vehicle object by amount y about the center of action.

Each geometry database 46 configuration appearing in the geometry display window 28 of the display device 30 has an event time associated with it. Each algorithm consists of two parts which are a data part and a execution part. Once the necessary data is supplied to the data part, the geometry database 46 is configured to represent the initial conditions of the object. Once the event time is initialized, the interrogation recording tool 10 will produce a sequence of geometric database configurations and associated event times by issuing the appropriate database manipulation commands. This will yield a display of the results in the geometry display window 28 at a specified rate. This provides a simulation that conforms to the witness testimony.

Of course, if the witness testimony contains inconsistencies, for example, if the witness statements describes parameters such as a viewing angle, speed, and timing, etc. which (according to the laws of physics) could not possibly occur, the displayed results will be inconsistent with the witness' statements. This information may then be given to the witness to allow him/her to rethink his/her recollection of events. It should be noted that the display of the setting in the display device 30 will also serve to refresh and sharpen the witnesses recollection of events. In addition, it will be appreciated that the interrogation recording tool 10 will be useful in attacking a witness' credibility when statements made by the witness do not conform to plausible physical scenarios.

The interrogation recording tool 10 also has the capability to encode a sequence of commands understood by the command interpreter 42 as an algorithm since an algorithm may consist wholly or in part of such commands. In effect, an algorithm is a new command that is invoked by giving its name to the command interpreter via the control panel 30. An algorithm may receive data via any means available to commands. For example, suppose that a geometry data base consists of a model of a human figure and that one wishes to be able to manipulate the left arm by moving the left hand via the graphical input device. It is desired that the hand, lower arm, and upper arm move as a flexible unit in the manner normally ascribed to a human figure. To accomplish the task the points of action of these three body parts identified are as follows:

upper arm—shoulder lower arm—elbow hand—wrist

The three body parts are hierarchically organized into virtual objects as follows:

| hand and lower arm | are a part of | lower extremity |
| lower extremity and upper arm | are a part of | left arm |

The movement of a virtual object causes all of its primitive member objects to move as a rigid unit. The point of action of a virtual object can be selected from the points of action of its primitive objects. For example the point of action of the virtual objects are as follows:

| lower extremity | point of action is selected as that of lower arm |
| left arm | point of action is selected as that of upper arm |

Now that the data objects are organized and points of action assigned, the positioning algorithm can be created so that the left arm can be flexibly positioned using the graphic input device. The following is an example of such an algorithm.

A=original angle at elbow

ΔA=change in angle at elbow a=distance between shoulder and hand b=distance between elbow and hand c=distance between elbow and shoulder e=x,y,z location of arm poa (point of action)

f=x,y,z location of graphic input device mapped location in data base g=line between e and f h=distance between e and f j=line between hand and shoulder if h>a+b {
    rotate lower extremity about its poa so that A + ΔA = 180°
    rotate left arm about its poa so that it is
    colinear with g
    done
}

$$\Delta A = \arccos\left(\frac{a^2 - b^2 - c^2}{-2bc}\right) - A$$

rotate lower extremity through angle ΔA about its poa rotate left arm about its poa so that j is colinear with g done This demonstrates that a flexible arm positioning procedure can be quickly and easily implemented in a natural way.

There are two ways in which the geometry data base 46 can be manipulated by the invention. The first is by rigid object motions which consist of the 6 rigid motions in various coordinate systems including x,y,z and roll, pitch, yaw. The second way is elastic deformations of objects. Such deformations change the shape of objects. Object deformation is effected by relative displacement of object vertices in accordance with a three-dimensional vector field associated with a plane of action. The vector in the field that determines the relative displacement of a given vertex is the unique vector in the field that is closest to the vertex. The new vertex position is determined by vectorially adding the field vector to the vertex. Since vector fields are continuous, a three-dimensional vector-valued continuous function of two variables must be used to create the field. The origin of the field on the plane of action is the plane's point of action. The orientation of the field is the initial roll, pitch, and yaw orientation of the plane of action. The dimensions, location, and orientation of the plane of action are entered via the commands of the invention. The function generating the vector field is encoded as an algorithm. The plane of action is stored in the geometry data base 46 as a planar object. For example, suppose that it is desired to reshape a flat rectangular monolithic panel into a semi-cylindrical shape along its horizontal axis i.e. a vertical semicylinder is formed. The following procedure and algorithm will accomplish this:
h=diameter of cylinder
l=width of panel
m=width of half the panel
x=horizontal coordinate of the plane of action
y=vertical coordinate of the plane of action
z=depth coordinate of the plane of action
f(x,y)=first vector field function
create a planar rectangle for the plane of action the same size as the rectangular panel orient the plane of action to establish its initial roll, pitch, and yaw orientation select point of action of the planar rectangle as the geometric center $$m = \frac{1}{2}$$

$$h = \frac{2l}{\pi}$$

$$f_x(x, y) = \frac{(h-1)x}{m}$$

$$f_y(x, y,) = 0$$

$$f_z(x, y,) = \sqrt{\frac{h^2}{4} - \left(\frac{h}{l}x\right)^2}$$

move the plane of action so that it is coincident with the panel apply the deformation.

Figure 5:
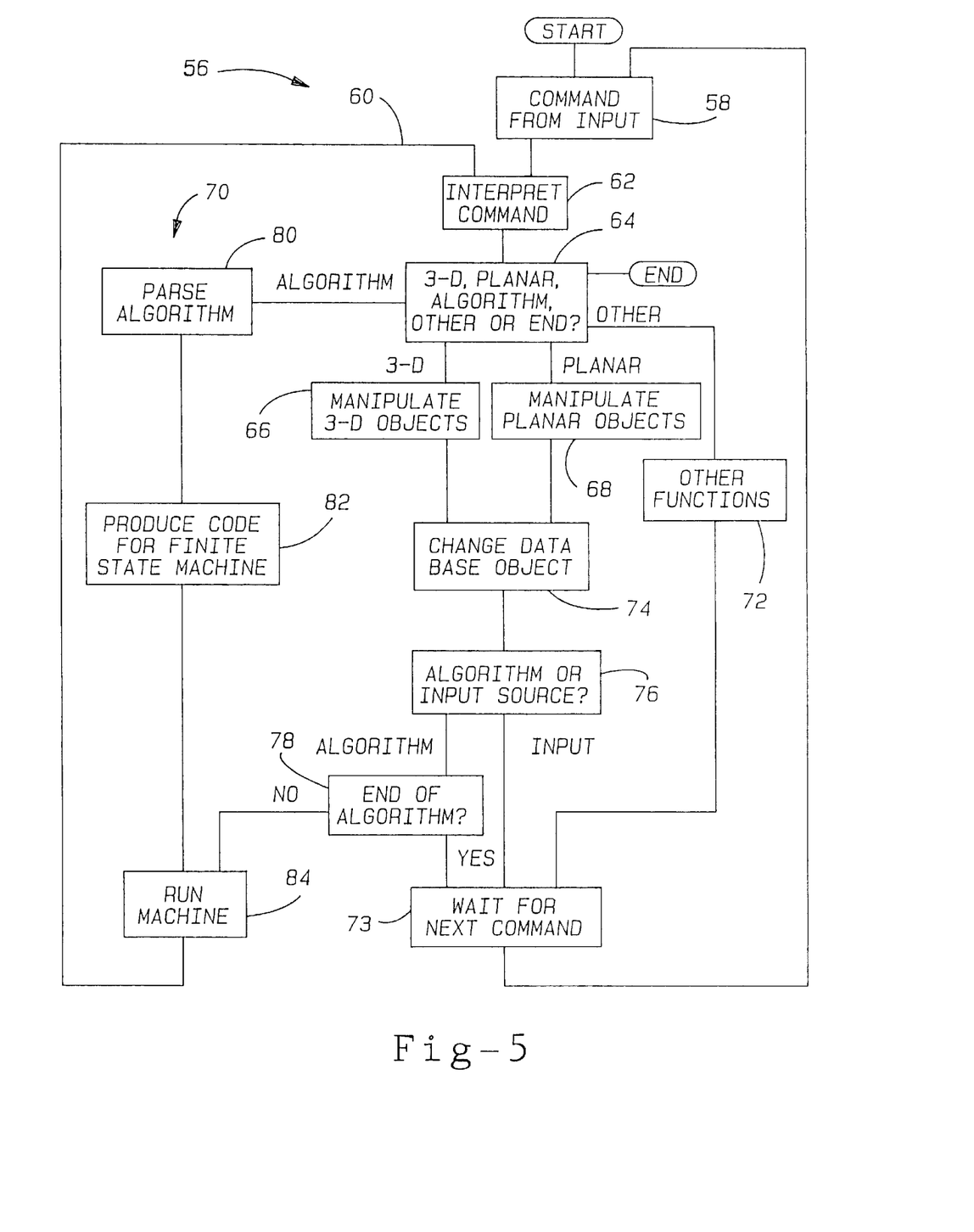
FIG. 5 is a software flow diagram of the present invention.

Referring now to FIG. 5 a software flow diagram 56 of the present invention is shown. Commands may come from either an input device (such as the graphic input device 18 or keyboard 16) as shown in block 58, or commands may come from the textual algorithm 54, through line 60. The command interpreter 42 will then interpret the command (block 62). Next, in block 64, the software 38 will determine whether the command relates to 3D objects, planar objects, the algorithm, some other function or is an end command. If the command is to manipulate 3D objects, step 66 is performed; if it is to manipulate planar objects, then step 68 is performed.

If the command relates to the algorithm then the software will enter the algorithm loop 70. If the command relates to some other function, then these are performed in Block 72, and the process goes to the "wait for next command" block 73. These other functions may include printing a picture appearing on the display window 28, saving a data base configuration, recalling an old data base configuration, etc. After the three-dimensional or planar objects are manipulated the software will then institute the change in the database object, in block 74, by changing the geometry database 46. Next, block 76 determines whether the command came from an algorithm or from an input source. If it was from an input source the software proceeds to the "wait for next command" block 73. Alternatively, if the command was from an algorithm, block 78 determines whether it is the end of the algorithm. If so, the system proceeds to the "wait for next command" block 73.

In more detail, the algorithm loop 70 begins by parsing the algorithm (block 80). Next, code is produced for the finite state machine (discussed above) in block 82. The "run machine" step then runs the algorithm (block 84), and the process goes back through line 60 to the interpret command block 62. If not, the process is directed back to the algorithm loop 70.

From the foregoing it can be seen that the present invention provides a means for recording the text of statements in a manner which permits the rapid visualization of the statements as well as the analysis of the configuration of objects and events described in those statements. In a legal setting, the present invention permits the events described by the statements to be immediately visualized by a witness and others. This serves to improve a witness' recollection as well as to improve the comprehension of the description to others. By providing constant feedback to the witness with a visual representation of his statements, the accuracy of the representation is enhanced. In addition, this feedback permits the witness to give on-the-spot testimony in response to the representation, which may then be entered in to a record and admitted as evidence. Also, the analysis performed by the present invention provides an important verification of the accuracy of the statements with respect to their physical feasibility. This may be used as a tool to either correct the statements where they contain inconsistencies and or to attack the credibility of a witness' statements.

While the above preferred embodiment of the present invention was directed to a legal application, it will be appreciated that it can also be used in many other settings where it is desired to create a visual display of statements in real time. For example, the present invention will have applications in non-legal settings such as in education, training, and lecturing. Those skilled in the art can appreciate that other advantages can be obtained from the use of this invention, and a modification may be made without departing from the true spirit of the invention after studying the specification, drawings and following claims.

What is claimed is:

1. A method for creating a visual display of a set of objects in response to a person's verbal statements describing actual objects and events occurring at different times, said method comprising:

receiving by an operator a plurality of said verbal statements containing descriptions of said objects at different times;

said operator entering information derived from said verbal statements into an interrogation recording tool, said statements being recorded and represented by the interrogation recording tool as graphical representations of the objects and events;

determining a plurality of locations, orientations, and forms of said objects in a temporal sequence corresponding to said description of said objects for at least two different times;

generating a plurality of the graphical representations of said objects in said temporal sequence; and displaying said plurality of the graphical representations of said objects to illustrate changes between different time periods, wherein the displayed graphical representations allow the person to review the graphical representations in real time immediately after being recorded so as to allow the operator to make changes and modifications to the graphical representations based on subsequent verbal statements made by the person.

2. The method of claim 1 further comprising the step of determining if said verbal statements are implausible based on an inconsistency between said representations produced and said verbal statements.

3. A method for creating a visual simulation of a sequence of events occurring at different times as described by a person's speech, said method comprising the steps of:

receiving verbal statements of said person describing said sequence of events by an operator;

said operator entering information into an interrogation recording tool, said information being derived from said verbal statements and including a description of objects and their geometric relationships over a period of time, said statements being recorded and represented by the interrogation recording tool as graphical representations of the events;

encoding the dynamics of geometric object relationships as textual algorithms;

storing a particular configuration of said objects and their geometric relationships in a geometry database;

modifying the objects and their geometric relationships in the geometric database in response to commands from either the operator or the textual algorithm to produce a new configuration of said objects and their geometric relationships; and displaying the objects and their geometric relationships in a sequence as described by said commands, wherein the displayed objects and geometric relationships allow the person to review the objects and geometric relationships in real time immediately after being recorded so as to allow the operator to make changes and modifications to the objects and geometric relationships based on subsequent verbal statements made by the person.

4. The method of claim 3 wherein said verbal statements are statements by a witness in a legal proceeding.

5. The method of claim 3 wherein said information which is entered by said operator, encoded in textual algorithms and displayed, includes both two dimensional and three dimensional objects.

6. The method of claim 3 wherein said information entered by said operator includes a plurality of viewing angles and said commands include commands to modify said viewing angle, and wherein said step of displaying displays said objects from a plurality of viewing angles.

7. The method of claim 3 wherein said information entered by said operator includes variations in the shape of said objects and said step of modifying modifies the shape of said objects.

8. The method of claim 3 wherein said step of encoding the dynamics includes the step of creating textual algorithms comprising a series of statements representing the objects and their geometric relationships over a period of time.

9. The method of claim 3 further comprising the step of viewing by said person the displayed sequence and verifying by said person the accuracy of the displayed sequence.

10. The method of claim 3 wherein said two dimensional objects include text.

11. The method of claim 3 wherein said textual algorithms perform the step of calculating the velocity of said objects based on said information.

12. The method of claim 3 further comprising the step of determining if said verbal statements are implausible based on an inconsistency between the encoded dynamics of the geometric object relationships in the textual algorithms and said verbal statements.

13. An interrogation recording tool for creating a visual simulation of a sequence of events occurring at different times as described by a person, said interrogation recording tool comprising:

interface means for permitting an operator to enter information based on verbal statements describing said sequence of events, said information including a description of objects and their geometric relationships over a period of time, said statements being recorded and represented by the interrogation recording tool as graphical representations of the events;

means for encoding the dynamics of said objects and their geometric relationships as textual algorithms;

means for storing a first configuration of said objects and their geometric relationships in a geometry database;

means for modifying the objects and their geometric relationships in a geometry database in response to commands from either the operator or the textual algorithm to produce a second and different configuration of said objects and their geometric relationships;

means for displaying the objects and their geometrical relationships in a sequence, including said first and second configurations, as described by said commands; and means for calculating and displaying the velocity of a given object as it moves between locations in the first and second configurations in the sequence, wherein the displayed movement of the object allows the person to review the display in real time immediately after being recorded so as to allow the operator to make changes to the movement of the object based on subsequent verbal statements made by the person.

14. The interrogation recording tool of claim 13 wherein said verbal statements are statements by a witness in a legal proceeding.

15. The interrogation recording tool of claim 13 wherein said information which is entered by said operator, encoded in textual algorithms and displayed, includes both two dimensional and three dimensional objects.

16. The interrogation recording tool of claim 13 wherein said information entered by said operator includes a plurality of viewing angles and said commands include commands to modify said viewing angle, and wherein said step of displaying displays said objects from a plurality of viewing angles.

17. The interrogation recording tool of claim 13 wherein said information entered by said operator includes variations in the shape of said objects and said step of modifying modifies the shape of said objects.

18. The interrogation recording tool of claim 13 wherein said step of encoding the dynamics includes the step of creating textual algorithms comprising a series of statements representing the objects and their geometric relationships over a period of time.

19. The interrogation recording tool of claim 13 further comprising the step of viewing by said person the displayed sequence and verifying by said person the accuracy of the display.

20. The interrogation recording tool of claim 15 wherein said two dimensional objects include text.

21. The system of claim 13 further comprising means for determining if said statements are implausible based on an inconsistency between the encoded dynamics of the objects and their geometric relationships in the textual algorithms and said verbal statements.

* * * * *